(12) United States Patent
Vaudour et al.

(10) Patent No.: US 10,773,470 B2
(45) Date of Patent: Sep. 15, 2020

(54) METHOD AND DEVICE FOR STAMPING AN UNCONSOLIDATED COMPOSITE BLANK WITH A THERMOPLASTIC MATRIX

(71) Applicant: DAHER AEROSPACE, Saint Julien de Chedon (FR)

(72) Inventors: Julie Vaudour, La Chevrolière (FR); Alexandre Pelard, Amboise (FR)

(73) Assignee: DAHER AEROSPACE, Saint Julien de Chédon (FR)

( * ) Notice: Subject to any disclaimer, the term of this patent is extended or adjusted under 35 U.S.C. 154(b) by 480 days.

(21) Appl. No.: 15/107,425

(22) PCT Filed: Dec. 24, 2014

(86) PCT No.: PCT/EP2014/079340
§ 371 (c)(1),
(2) Date: Jun. 22, 2016

(87) PCT Pub. No.: WO2015/097301
PCT Pub. Date: Jul. 2, 2015

(65) Prior Publication Data
US 2017/0001383 A1    Jan. 5, 2017

(30) Foreign Application Priority Data

Dec. 24, 2013 (FR) ...................................... 13 63575

(51) Int. Cl.
*B29C 70/34* (2006.01)
*B29C 70/38* (2006.01)
(Continued)

(52) U.S. Cl.
CPC ............ *B29C 70/34* (2013.01); *B29C 59/005* (2013.01); *B29C 59/026* (2013.01);
(Continued)

(58) Field of Classification Search
CPC ...... B29C 70/34; B29C 70/345; B29C 70/386; B29C 70/541; B29C 70/543; B29C 70/40; B29C 70/46
See application file for complete search history.

(56) References Cited

U.S. PATENT DOCUMENTS

2004/0265409 A1* 12/2004 Keeley ................. B29B 13/023
425/143
2005/0127566 A1* 6/2005 Chotard ................. B29C 70/46
264/320
(Continued)

FOREIGN PATENT DOCUMENTS

FR    2 905 891 A1    3/2008
FR    2 922 276 A1    4/2009
(Continued)

OTHER PUBLICATIONS

Materials Processing, Academic Press, 2016, p. 328, ISBN 9780123851321, retrieved from http://www.sciencedirect.com/science/article/pii/B9780123851321000045 (Year: 2016).*

*Primary Examiner* — John L Goff, II
(74) *Attorney, Agent, or Firm* — Im IP Law; Chai Im; C. Andrew Im

(57) ABSTRACT

A method for the hot stamping of a composite part with continuous fiber reinforcement in a thermoplastic matrix. A blank including a laminated structure of plies consisting in unidirectional tapes of fibers pre-impregnated with thermoplastic polymer is obtained. The blank is heated in the open to a temperature greater than or equal to the melting temperature of the polymer making up the matrix. The blank is then stamped.

4 Claims, 2 Drawing Sheets

(51) Int. Cl.
  *B29C 70/54*  (2006.01)
  *B29C 59/00*  (2006.01)
  *B29C 59/02*  (2006.01)
  *B29K 71/00*  (2006.01)
  *B29L 31/30*  (2006.01)
(52) U.S. Cl.
  CPC .......... *B29C 70/345* (2013.01); *B29C 70/386* (2013.01); *B29C 70/541* (2013.01); *B29C 70/543* (2013.01); *B29K 2071/00* (2013.01); *B29K 2871/00* (2013.01); *B29K 2995/0041* (2013.01); *B29L 2031/3076* (2013.01)

(56)  References Cited

U.S. PATENT DOCUMENTS

| | | |
|---|---|---|
| 2009/0321978 A1 | 12/2009 | Kurtz et al. |
| 2011/0017386 A1 | 1/2011 | Bouvet et al. |
| 2011/0097575 A1* | 4/2011 | Pratte .................. B29C 70/086 428/336 |
| 2012/0067509 A1* | 3/2012 | Kurtz .................... B29C 70/46 156/181 |
| 2014/0235787 A1* | 8/2014 | Capra ................ C08G 65/4012 524/592 |
| 2015/0099091 A1* | 4/2015 | Kurtz .................. B29C 70/345 428/114 |

FOREIGN PATENT DOCUMENTS

| | | |
|---|---|---|
| FR | 2 929 167 A1 | 10/2009 |
| FR | 2 987 304 A1 | 8/2013 |
| WO | 2010/097547 A2 | 9/2010 |
| WO | 2013/127965 A1 | 9/2013 |

\* cited by examiner

METHOD AND DEVICE FOR STAMPING AN UNCONSOLIDATED COMPOSITE BLANK WITH A THERMOPLASTIC MATRIX

RELATED APPLICATIONS

This application is a § 371 application from PCT/EP2014/079340 filed Dec. 24, 2014, which claims priority from French Patent Application No. 13 63575 filed Dec. 24, 2013, each of which is incorporated herein by reference in its entirety.

FIELD OF THE INVENTION

The invention relates to a method and a device for stamping an unconsolidated composite blank with a thermoplastic matrix. The invention is more particularly, but not exclusively, suited for making a shaped composite part, reinforced by continuous carbon, glass or aramid fibers in a thermoplastic matrix, with mass reinforcement rates ranging from 50% to 70% or less. Thus, the invention is particularly suited to the field of aeronautics, but is advantageously adaptable to other technical areas with similar requirements regarding structure and reliability.

BACKGROUND OF THE INVENTION

In the prior art, a shaped composite part with a thermoplastic matrix is achieved by hot stamping a consolidated laminated blank. When the reinforcing phase of said composite is made up of continuous fibers, forming the blank by stamping involves the inter-laminar slipping of the plies that make up the laminated structure of said composite. Such inter-laminar slipping is only possible if the matrix of said composite is in a sufficiently fluid state during the stamping operation. That state is achieved by heating the blank, prior to stamping, to a temperature above the melting temperature of the polymer that makes up the matrix of the composite. When the polymer is a high-performance thermoplastic polymer such as polyetheretherketone or PEEK, the heating temperature is high, commonly located between 350° C. and 440° C. That temperature must be reached throughout the volume of the blank to allow the slipping of the plies of continuous fibers and prevent the introduction of tension in the fibers, squeezing between fibers and waving of fibers, as those defects would have disastrous consequences on the mechanical properties of the part thus made. Thus, it is commonly accepted and experimentally observed that the blank to be made using the stamping operation must be free from defects such as porosities. That is because according to the experimental findings of the prior art, the presence of an air knife in the laminated structure, even over a short distance, creates uneven temperatures during heating, which defect leads to a point of fixation between the affected plies or fibers, which point of fixation locally opposes inter-laminar slipping. Further, the air knife collects the products of the gas released when the blank is heated and is not closed during stamping. Thus, in the prior art, the method for stamping a composite material with a thermoplastic matrix is based on the observation that any porosity in the blank will be present in the final part made by stamping the blank.

Thus, the stamping method according to the prior art is applied to nested blanks that are trimmed out of a consolidated plate, where particular care is taken to make said plate, which undergoes inspection that is as stringent as that of the final part, increasing the cost of the parts made using this method of the prior art. The document WO 2013/127965 describes a method for making such a consolidated plate.

The consolidation of a composite comprising a matrix made of thermoplastic polymer includes three phenomena:
one essentially mechanical phenomenon, which tends to create close contact between plies as a result of the pressure and viscosity of the polymer;
one essentially chemical phenomenon known as autohesion, which leads to the adhesion of plies to each other by the diffusion of molecular segments through the interface and then the whole thickness of the plies;
a polymer flow phenomenon, sometimes named impregnation, where the closed voids remaining in the material are filled.

The document FR 2 987 304 describes a hot stamping method for a composite material with continuous reinforcement, using a blank in a state known as the pre-consolidated state, obtained by placing fibers and partial autohesion between plies, that is to say adhesion of plies to each other over their entire contact interface, with no voids at the interface, where the segments of the molecular chains of the polymer making up the matrix diffuse over a very limited thickness between the plies on each side of the interface. That state is different from the state known as the consolidated state, where autohesion is large, where the molecular chains of the polymer making up the matrix extend and interlace over the entire thickness of the plies. Even though the method is an improvement on the prior art, it however makes it necessary for the quality of the blank to still be high, with a porosity rate below 1%. Also, the method is carried out at a high temperature, that is to say at a temperature above the melting temperature of the material, and so the impregnation phenomenon occurs and can reach that low level of porosity.

The document FR 2 922 276/WO 2010 0097547 describes a method for obtaining a shaped part using an assembly of unconsolidated plies. The method is not a stamping method, it is a method that can be assimilated with molding, as the unconsolidated assembly of plies undergoes a complete cycle of heating and cooling, including consolidation, inside a closed mold where a vacuum is applied to the cavity. Applying a vacuum to the closed cavity removes the air between plies. The productivity of such a method is modest compared to the stamping method and leads to very little or no inter-laminar slipping compared to the stamping method.

OBJECT AND SUMMARY OF THE INVENTION

This invention aims to solve the drawbacks of the prior art and relates to that end to a method for the hot stamping of a composite part with continuous fiber reinforcement in a thermoplastic matrix, which method includes the steps of:
a. obtaining a blank comprising an unconsolidated laminated structure of plies consisting in unidirectional tapes of fibers pre-impregnated with thermoplastic polymer;
b. heating the blank in the open air to a temperature greater than or equal to the melting temperature of the polymer making up the matrix;
c. stamping the blank.

Thus, surprisingly and contrary to the certainties of those skilled in the art, the exclusive use of unidirectional tapes for making up the plies allows the direct stamping of the blank made up in that way, unconsolidated, even in the absence of any assembly of plies with each other, without creating any defects in the part made in that way. The term 'unconsolidated' refers simultaneously to a stack of plies with no adhesion between plies, an assembly of plies where the adhesion between plies is distributed discretely in the volume of the blank, leaving macroscopic zones where the plies are not at all assembled to each other, and cases where the plies adhere to each other over all their contact interfaces, but where at least one of the three phenomena that make it possible to carry out the consolidation does not occur, so that a high rate of porosity remains in the blank. The blank is heated in the open air, that is to say the method according to the invention does not make it necessary to apply a vacuum to the stack making up the blank and is implemented, from the viewpoint of stamping, in the same conditions as stamping a blank consolidated according to the prior art.

When applied to thermoplastic fibers, the term 'pre-impregnated' is used herein to refer to thermoplastic strands calendared with a polymer film, powdered with a thermoplastic polymer or comprising thermoplastic fibers comingled with reinforcing fibers. In all cases, the reinforcing fibers themselves are not impregnated or are only partly impregnated with the polymer. This type of product is a product that is effectively available in the market under the improper name of pre-impregnated material.

The term in the open air means that when the blank is heated, it is not located in a confined space and is not subjected to a vacuum or pressure other than atmospheric pressure.

The invention can be implemented advantageously in the embodiments described below, which may be considered individually or in any technically operative combination.

In one particular embodiment of the method according to the invention, the step (a) comprises a step consisting in assembling the plies by means of welded spots. Thus, the bonding of the blank before it is stamped is improved. The limitation of the assembly of plies to each other to welded spots makes it possible to retain the surprising effect.

In another particular embodiment of the method according to the invention, each ply is made up of strips assembled edge to edge by means of a weld. This embodiment makes it possible to easily make blanks with significant widths, particularly blanks comprising fibers turned in oblique directions, making said blank sufficiently bonded to allow it to be manipulated with no risk of upsetting the direction of said strips.

In a third embodiment, the method according to the invention comprises, prior to step (a), a step of:
d. selecting, for making up the matrix, a thermoplastic polymer with a recrystallization temperature between the glass transition temperature Tg and the melting temperature Tf of said polymer;
wherein step (a) comprises a step of:
ai. laying up the plies, in the form of pre-impregnated strips, using a laying up machine comprising a means to heat said strip, during the depositing process, wherein the heating temperature is below the melting temperature of the polymer and above the recrystallization temperature.

This embodiment includes a selection of the characteristics of the polymer that makes up the matrix and makes it possible, in certain conditions, to assemble the plies with each other over their entire contact surface and make a rough piece using automatic laying up means. Thus, a rough piece in the form of a large plate is obtained economically, and even if it is not consolidated or even partly consolidated, the bonding of said piece allows the making of blanks in complex shapes, such as by trimming. Alternatively, the blank is made directly by laying up wide strips or automatically placing fibers. In the latter case, the method according to the invention makes it possible to better follow the direction of fibers in relation to the contour of the flank, particularly for curved parts. Said rough piece or blank are made economically without a consolidation step. The heating of strips deposited in the conditions of the method according to the invention makes it possible to make said strips sufficiently tacky for automatic laying up, without consolidating the plies. In a second surprising effect, the combination of the selection of the material and the use of a low temperature for assembling the unidirectional strips during laying up makes it possible to obtain a defect-free part with direct stamping, that is to say without a consolidation step between laying up and stamping.

Advantageously, step (d) comprises the steps of:
di carrying out a differential scanning calorimetry analysis of the pre-impregnated material;
dii selecting said pre-impregnated material if the result of said differential scanning calorimetry shows, upon heating, an exothermic peak between the glass transition temperature and the melting temperature of the polymer.

Thus, a simple characterization method makes it possible to verify the adaptation of the pre-impregnated material for the successful application of the method according to the invention in its embodiments comprising a continuous assembly of plies or strips making up plies. According to the invention, the temperature at which the exothermic peak occurs is called the 'recrystallization temperature', as such a phenomenon of recrystallization is the most likely explanation for the presence of such an exothermic peak on the scanning calorimetry analysis curve during heating, without being bound by any theory.

In a particular embodiment, the polymer making up the matrix is a semi-crystalline polyetheretherketone with a crystallinity rate at ambient temperature ranging between 5% and 20%. That particular selection of the polymer making up the matrix, compatible with steps (di) and (dii) of the method according to the invention makes it possible to considerably reduce the cost of making a high-performance composite part.

Advantageously, when the polymer is PEEK, step (ai) is carried out at a temperature between 200° C. and 330° C., preferably 250° C. In addition to the benefits outlined above, such laying up with heating at a low temperature improves the quality of the blank or rough piece, and avoids the phenomenon of PEEK oxidation during laying up.

In one particular embodiment of the method according to the invention, step (a) is carried out by stacking the plies on a tool, known as the transfer tool, comprising means for positioning and holding the plies on their perimeter. This embodiment makes it possible to create a stamping blank from unassembled plies and thus does away completely with the step in the prior art consisting in making a consolidated rough piece.

Advantageously, the transfer tool is a frame, and step (b) is carried out when the plies stacked during step (a) are on said frame.

In an alternative embodiment, the transfer tool comprises a polyimide film, and the plies are assembled and held on said film by means of adhesive tape on their perimeter. This embodiment is particularly simple to implement.

BRIEF DESCRIPTION OF THE DRAWINGS

The invention is described below in its preferred embodiments, which are not limitative in any way, and by reference to FIGS. 1 to 3, wherein.

Figure 1:
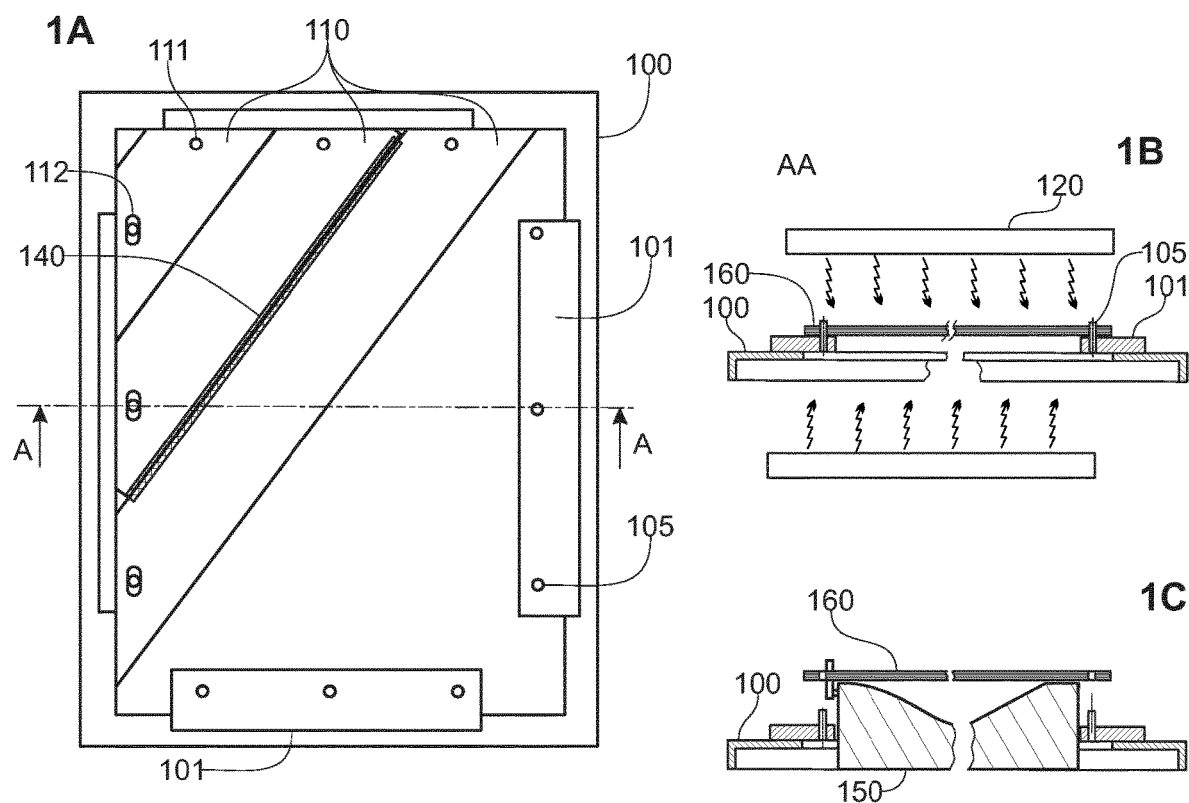
FIG. 1 is a schematic view of an exemplary embodiment of the method according to the invention, using an assembly of unidirectional strips, illustrated in FIG. 1A in a top view.
Figure 2:
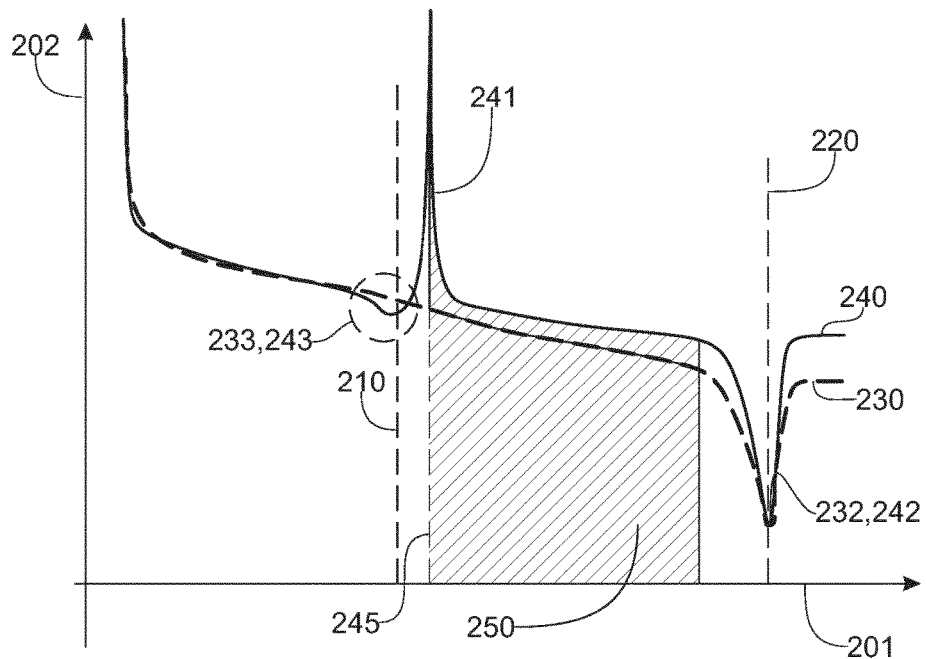
Figure 3:
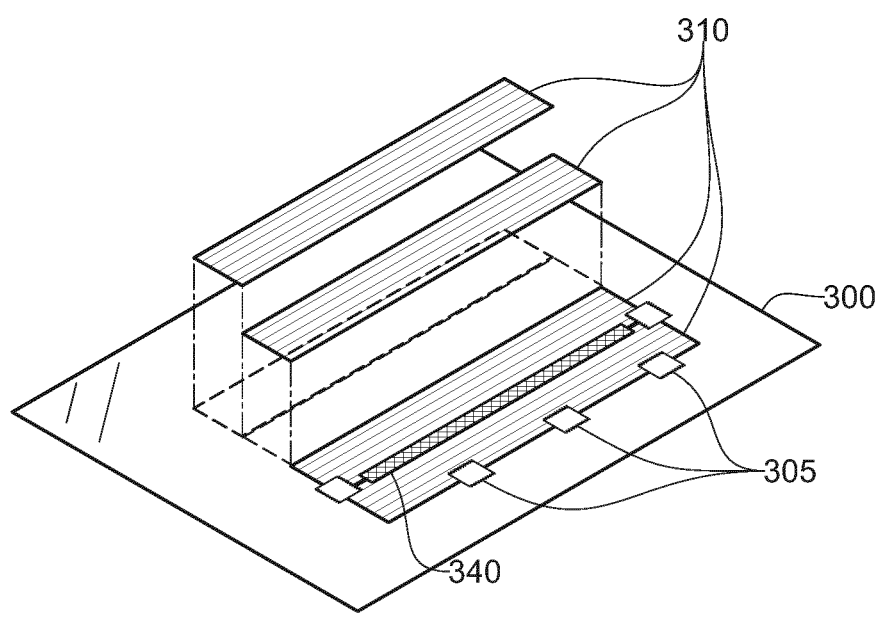

the stack thus made is heated, as illustrated in FIG. 1B in a sectional view AA defined in FIG. 1A and stamped as illustrated in FIG. 1C in a sectional view AA;

FIG. 2 is an example of the differential thermal analysis curves applied to two thermoplastic pre-impregnated materials;

and FIG. 3 is a schematic perspective exploded view of an example of an assembly of unidirectional strips on a transfer tool made of a polyimide film, in an exemplary embodiment of the method according to the invention.

DETAILED DESCRIPTION OF THE EMBODIMENTS

In FIG. 1A of an exemplary embodiment of the method according to the invention, strips (110) made of unidirectional tapes of fibers pre-impregnated with a thermoplastic polymer are placed on a tool (100) known as the transfer frame. Said tool comprises a support frame, on which are fixed plates (101), each of which comprises positioning means (105), for example in the form of a pin protruding from said plate (101). Each unidirectional strip (110) comprises one or more openings (111, 112) adapted to cooperate with said positioning means (105). The unidirectional strips (110) are individually sufficiently rigid to be placed on said frame (100) manually or using automatic means, such as a pick and place type of robot with a vacuum pad. A stack of unidirectional plies is thus obtained, without joining the plies or strips to each other.

In FIG. 1B of an exemplary embodiment, the frame (100) used as the transfer frame and the stack thus made, which makes up the blank (160) for stamping, are placed under heating means (120), such as radiating panels for instance. Said heating means raise the temperature of the blank (160) above the melting temperature Tf of the thermoplastic polymer. As a non-limiting example, if said polymer is PEEK, the heating temperature reaches 440° C.

In FIG. 1C, after that heating step, the blank (160) is stamped by deforming it between a die (150) and an effector (not shown) with a shape complementary to that of the die (150) so as to make a shaped part. The part thus obtained is surprisingly free from defects.

In FIG. 3 of an alternative embodiment, the unidirectional strips (310) are placed on polyimide film (300) that withstands the temperature reached during the stamping process, and which is used as the transfer tool. In this exemplary embodiment, said strips (310) are simply held on their perimeter on said film (300) using adhesive tape (305), suitable for the temperature of application of the method. The heating operation prior to stamping and the stamping operation itself are carried out when the strips (310) are on the polyimide film (300) using known techniques of the prior art.

Without being bound by any theory, it is presumed that the use of unidirectional strips and the absence of continuous assembly between the plies make it possible for gas and air to escape when the polymer expands during heating and while stamping. This embodiment is suitable when the blank is sufficiently small, or its shape is simple, so that the unidirectional strips can be positioned with a small number of positioning means. In other cases, the plies or strips need to be assembled.

In one embodiment, the plies are assembled by means of weld spots. This embodiment makes it possible to pre-assemble the plies that make up the blank depending on the thickness of said blank. Such spot welding is easily achieved on the transfer tool or outside said tool, using a soldering iron that is suitable for locally raising the polymer pre-impregnating the fibers to its melting temperature. These spot welds give the blank a certain degree of bonding, allowing it to be manipulated away from the transfer tool, without losing the benefits of the method according to the invention. In another alternative embodiment compatible with the previous one, the strips (110, 310) are welded edge to edge using weld lines (140, 340). These weld lines extend over a small width on each side of the edges of the strips in contact and are obtained, for example, using a soldering iron that is suitable for raising the temperature of the polymer pre-impregnating the strips (110, 310) to its melting temperature. Alternatively, said weld is made by other known means of the prior art, such as for instance heating by laser radiation.

When the blank comprises complex trimming that makes it necessary for it to be cut in a rough piece or when the shape of the part makes it necessary for the layered structure to be obtained by placing fibers, so that the fibers are correctly oriented in all respects in relation to the shape, or when the blank is large, said rough piece or blank are preferably made using automatic laying up. Throughout the document, 'laying up' refers to the laying up of strips and the placing of fibers, as the essential conditions of application of these methods are similar in the context of this invention.

In a third embodiment of the method according to the invention, the rough piece is made by laying up and assembling the strips and plies with each other. Such laying up is achieved by automatically or manually depositing strips that are 3 mm to 305 mm wide (12"), and the strips are assembled with each other over the entire surface of their interfaces. The depositing of narrow strips (for example 3 mm) is obtained preferably by means of a machine or robot suitable for placing fibers. Wide strips are deposited by means of a laying up machine or manually. This embodiment surprisingly makes it possible to obtain a defect-free part, without going through the step of consolidating the rough piece. The result is achieved by combining the three conditions for implementation below:

laying up is carried out by means of strips made of unidirectional fibers;

the thermoplastic polymer impregnating the fibers has a recrystallization temperature that is located between the glass transition temperature and the melting temperature;

the heating temperature of the strips during depositing is above the recrystallization temperature and below the melting temperature Tf of the polymer impregnating the fibers.

The heating of the strips pre-impregnated with thermoplastic polymer is indispensable during laying up. That is because said strips are not tacky and must be heated to adhere to the preform deposited already. In the prior art, machines suitable for automatic laying up of fibers impregnated with thermoplastic polymer use heating to a temperature equal to or above the melting temperature of said polymer for that purpose. Thus, if the polymer is PEEK, the melting temperature of which is 343° C., that heating temperature during deposition according to the prior art is typically 400° C. or more. In the method according to the invention, the heating temperature during deposition is, in an exemplary embodiment, limited to 250° C. for a strip impregnated with PEEK. That low temperature does not lead to the melting of said polymer. Thus, firstly, the impregnation phenomenon does not occur and porosities remain in the assembly, and secondly, molecular diffusion at the interface is slowed down and thus does not allow the autohesion phenomenon. However, such low-temperature heating makes the strip or the area of the strip thus heated sufficiently tacky to adhere to the preform. Without being bound by any theory, it is presumed that the adhesion between plies occurs through the joint crystallization of the amorphous phases of the polymer, on both sides of the interface. Such joint crystallization is obtained by recrystallization of the polymer when heated.

That surprising possibility to limit the heating temperature during deposition and then stamping the part from an unconsolidated blank while assuring the quality of the material of the final part is only verified when strips made of unidirectional fibers are used and the thermoplastic polymer selected shows a recrystallization peak between its glass transition temperature and its melting temperature.

In FIG. 2, differential scanning calorimetry analysis is a known characterization technique of the prior art. It makes it possible to measure the enthalpy variation of the material as it is heated and consists in heating two samples, one made of the material to test and the other made of control material. The two samples are heated in two separate furnaces with a zero temperature difference between the two samples. The curve provides the thermal flow (202) between the two samples depending on the temperature (201). The appearance of a peak in that change shows the presence of a phase transition that involves a transition with latent heat. Depending on the nature of the phase transition, said peak (232, 242) points downward, and is then called 'endothermic' or points upward and is called 'exothermic'.

The differential scanning calorimetry analysis curve (230) for a pre-impregnated part made of PEEK carbon fibers with a crystallinity rate of 30% at ambient temperature shows, upon heating, a first (233) disturbance of the curve corresponding to the passing of the glass transition (Tg) temperature (210), then an endothermic peak (232) at the melting temperature (Tf) (220) of the polymer. The differential scanning calorimetry analysis curve (240) of pre-impregnated material made of carbon—PEEK where the PEEK has a crystallinity rate ranging from 5% to 20% at ambient temperature shows, upon heating, a first disturbance (243) corresponding to the passing of the glass transition Tg, then an exothermic peak (241) before the endothermic peak (242) of melting. That exothermic peak (241) produced during heating is interpreted as a recrystallization peak. The temperature (245) that is substantially centered on said exothermic peak (241) is known as the recrystallization temperature because it occurs during heating, when the material is initially in the crystallized state. The material with a curve (230) that does not show such a recrystallization peak (241), that is, in this example, the material pre-impregnated with PEEK with a rate of recrystallization at ambient temperature above 20%, is not suitable for the embodiments of the method according to this invention, which use assemblies of strips of unidirectional fibers over the entire contact surface, that is to say essentially the deposition of strips by means of automated laying up. On the other hand, the material with a calorimetry analysis curve (240) showing an exothermic peak (241) upon heating makes it possible to assemble unidirectional strips over their entire surface, providing the assembly is carried out by heating the strips within a temperature range (250) between the temperature (245) of the exothermic peak (241) and the melting temperature (220). For example, with material pre-impregnated with PEEK having a crystallinity rate at ambient temperature ranging between 5% and 20%, pre-impregnated strips can be laid up automatically at a temperature of 250° C. That low temperature also prevents the phenomena of oxidation of said polymer during the corresponding heating process. Such continuous heating at low temperature makes the pre-impregnated strips sufficiently tacky for implementation according to an automated laying up process.

Thermoplastic pre-impregnated material that does not show such a recrystallization peak (241), for example PEEK pre-impregnated material with a crystallinity rate at ambient temperature of 30%, cannot be assembled during laying up or placing of fibers by heating within a temperature range (250) that is as low, because such heating does not make it sufficiently tacky to allow the adhesion of the strips to the preform. Thus, in the case of automated laying up of PEEK pre-impregnated material with a crystallinity rate at ambient temperature above 20%, the heating temperature during laying up must be greater than or equal to the melting temperature (220) of the PEEK, and the adhesion of the strips deposited on the preform is then necessarily accompanied by autohesion, even in part, of the plies to each other. On the other hand, that PEEK with a crystallinity rate at ambient temperature of 20% or more is suitable for implementation using the embodiments of the method according to the invention without assembling the plies or by partial welding, spot welding or a weld line.

The description above and the exemplary embodiments show that the invention reaches the objectives sought; in particular, by using plies made of unidirectional fibers pre-impregnated with any thermoplastic polymer, it allows the stamping of plies that are unassembled or partly assembled by spot welding, and by selecting a polymer to impregnate the plies, which selection has particular characteristics and is associated with specific laying up conditions, the method according to the invention makes it possible to achieve a similar result while using a rough piece obtained by automated laying up. According to these two embodiments of the method according to the invention, the step of obtaining a consolidated plate, which is considered to be indispensable in the prior art, is removed.

The invention claimed is:

1. A method for hot stamping a composite part with continuous fiber reinforcement in a thermoplastic matrix, comprising the steps of:
   obtaining a blank consisting of an unconsolidated laminated structure of plies consisting in unidirectional tapes of fibers pre-impregnated with a thermoplastic polymer, the plies being assembled together by welding spots or assembled edge to edge by welding lines;
   heating the unconsolidated blank thus obtained and positioned on top of a transfer tool in an open air under a radiating panel so as to raise a temperature of the blank up to a temperature greater than or equal to a melting temperature of the polymer making up the thermoplastic matrix; and
   hot stamping the unconsolidated blank following the heating step performed in the open air, by deforming the unconsolidated blank between a die and an effector with a shape complementary to that of the die, the deformation involving an inter-laminar slipping of the plies that make up the laminated structure, so as to make a shaped part.

2. The method according to claim 1, wherein the transfer tool comprises a component to position and hold the plies on their perimeter.

3. The method according to claim 2, wherein the transfer tool is a support frame.

4. The method according to claim 1, wherein the transfer tool comprises a polyimide film; and wherein the plies are assembled and held on said polyimide film by an adhesive tape on their perimeter.

* * * * *